United States Patent [19]

Wendel et al.

[11] 4,051,093
[45] Sept. 27, 1977

[54] MANUFACTURE OF SHEAR-RESISTANT AQUEOUS COPOLYMER EMULSIONS

[75] Inventors: Kurt Wendel, Ludwigshafen; Fritz Reichel, Eppelheim; Christof Taubitz, Ludwigshafen, all of Germany

[73] Assignee: BASF Aktiengesellschaft, Ludwigshafen, Germany

[21] Appl. No.: 626,749

[22] Filed: Oct. 29, 1975

[30] Foreign Application Priority Data

Nov. 6, 1974 Germany .............................. 2452585

[51] Int. Cl.$^2$ ...................... C08L 25/04; C08L 33/02
[52] U.S. Cl. ...................... 260/29.6 TA; 260/29.6 H; 260/29.6 SQ; 260/29.6 HN; 427/390 R; 427/391
[58] Field of Search ................. 260/29.6 T, 29.6 TA, 260/29.6 HN, 29.6 SQ, 29.6 PM, 29.6 H; 526/80

[56] References Cited

U.S. PATENT DOCUMENTS

| | | |
|---|---|---|
| 3,296,167 | 1/1967 | Turner et al. ......................... 526/80 |
| 3,404,114 | 10/1968 | Snyder et al. ............... 260/29.6 TA |
| 3,536,650 | 10/1970 | Jasinski et al. ................. 260/29.6 T |
| 3,853,803 | 12/1974 | Anderson et al. ........... 260/29.6 TA |
| 3,925,288 | 12/1975 | Ganslaw et al. ............. 260/29.6 TA |
| 3,957,710 | 5/1976 | Rohmann et al. ........... 260/29.6 TA |

*Primary Examiner*—Lorenzo B. Hayes
*Attorney, Agent, or Firm*—Keil, Thompson & Shurtleff

[57] ABSTRACT

Shear-resistant aqueous copolymer emulsions which can be used for sizing paper are manufactured by first copolymerizing, in the aqueous phase of an aqueous emulsion, using conventional polymerization initiators which form free radicals, (A) from 0.5 to 15 per cent by weight of monomers containing a polymerizable C=C bond and at least one carboxyl and/or sulfonic acid or phosphate or phosphite group with (B) from 5 to 30 per cent by weight of monomers containing a C=C bond and a tertiary or quaternary amino group, or a nitrogen-containing heterocyclic group, and then adding, while continuing the copolymerization, (C) from 0 to 94.5 per cent by weight of styrene and/or acrylonitrile and (D) from 0 to 94.5 per cent by weight of acrylic or methacrylic acid esters of alkanols of 1 to 8 carbon atoms as well as (E) from 0 to 30 per cent by weight of further olefinically unsaturated monomers, and completing the polymerization, the pH during the polymerization being less than 7 and the amount of monomers (C) and (D) together being at least 25 per cent by weight.

3 Claims, No Drawings

MANUFACTURE OF SHEAR-RESISTANT AQUEOUS COPOLYMER EMULSIONS

This invention relates to a process of manufacturing shear-resistant aqueous polymer emulsions.

German Printed Application No. 1,546,236 discloses a process for the manufacture of cationic copolymer emulsions in which the following are copolymerized in aqueous emulsion:

a. From 20 to 60 percent by weight of styrene and/or acrylonitrile,
b. from 20 to 60 percent by weight of acrylic or methacrylic acid esters of alkanols of 2 to 8 carbon atoms and
c. from 5 to 50 percent by weight of acrylic or methacrylic acid esters which contain a quaternary ammonium group in the alcohol radical and optionally contain up to 20 percent by weight of other ethylenic monomers.

In this conventional process, the acrylic or methacrylic acid esters containing quaternary ammonium groups are entirely, or predominantly, introduced at the start into the aqueous phase, and the other monomers are gradually added thereto, whilst copolymerization takes place. Further ethylenic comonomers (d) which may be used in the conventional process are, e.g., acrylamide, methacrylamide, N-methylolmethacrylamide, N-butoxymethylacrylamide, vinyl acetate, vinyl propionate, vinylpyrrolidone and β-hydroxyethyl acrylate. In this process, cationic or non-ionic emulsifiers are employed and the polymerization is carried out in a medium which ranges from acid to at most weakly alkaline. The emulsions obtained may be used in particular as sizing agents for paper. In general, such emulsions are only stable to electrolytes if they contain more than 30% of (c), and their shear resistance is also not fully satisfactory if the content of monomers (c) is less than 30%.

U.S. Pat. No. 3,404,114 discloses a process for the manufacture of anionic polymer emulsions which exhibit improved adhesiveness and improved frost stability. This process uses anionic and non-ionic emulsifiers. The copolymers are required to contain from 1 to 25% by weight of olefinic carboxylic acids, e.g. acrylic acid, from 50 to 98 percent by weight of a monovinylidene monomer and from 1 to 25 percent by weight of an alkylaminoalkyl ester of an α,β-olefinic carboxylic acid, e.g. tert-butylaminoethyl methacrylate, as copolymerized units. In this process, it is necessary to observe a particular sequence of addition of the components in order to avoid the formation of substantial amounts of coagulate and also in order to achieve as complete polymerization as possible: first, an aqueous solution of the polymerization catalyst and the emulsifier is heated, and then the unsaturated carboxylic acid and a part of the monovinylidene monomer are added. The pH is then brought to 7 or above by addition of ammonia or an amine and finally the alkylaminoalkyl ester and the remainder of the monovinylidene monomer are added. The anionic emulsions obtained may be used in paints, but their shear resistance is not fully satisfactory, particularly at pH less than 7.

Finally, British Pat. No. 1,185,293 discloses the manufacture of cationic polymer emulsions from ethylenic carboxylic acids, alkyl acrylates or methacrylates and alkylaminoalkyl acrylates or methacrylates, the polymers containing at least 15% of the alkylaminoalkyl esters, by feeding the monomers conjointly, as an emulsion, into the polymerization vessel, which contains the emulsifier, polymerization catalyst and water. However, this process only gives emulsions if the content of basic monomers exceeds 20%. The emulsions obtained sediment rapidly and are mechanically very unstable; furthermore, their stability to salts is not fully satisfactory.

We have found that shear-resistant aqueous copolymer emulsions can be manufactured by copolymerization of acrylic or methacrylic acid esters of alkanols of 1 to 8 carbon atoms and/or of styrene and/or of acrylonitrile with minor amounts of monomers, which contain a polymerizable C=C bond and a carboxyl and/or sulfonic acid or phosphate or phosphite group, optionally together with further copolymerizable ethylenic monomers, using conventional polymerization initiators which form free radicals, by first copolymerizing, in an aqueous phase (the quantities being based on total monomers)

A. from 0.5 to 15 percent by weight of monomers containing a polymerizable C=C bond and at least one carboxyl and/or sulfonic acid or phosphate or phosphite group with
B. from 5 to 30 percent by weight of monomers containing a C=C double bond and a tertiary or quaternary amino group, or a nitrogen-containing heterocyclic group, and then adding, whilst continuing the copolymerization,
C. from 0 to 94.5 percent by weight of styrene and/or acrylonitrile and
D. from 0 to 94.5 percent by weight of acrylic or methacrylic acid esters as well as
E. from 0 to 30 percent by weight of further olefinic monomers, and completing the polymerization, the pH during the polymerization being less than 7 and the amount of monomers (C) and (D) together being at least 25 percent by weight.

Acrylic and methacrylic acid esters of particular interest for the process are those of alkanols of 2 to 8 carbon atoms, such as ethanol, isopropanol, n-propanol, n-butanol, isobutanol, tert-butanol, n-hexanol, n-octanol, isooctanol and 2-ethylhexyl alcohol. Methyl acrylate and methyl methacrylate may also be used. Acrylic and methacrylic acid esters of alkanols of 2 to 4 carbon atoms, such as ethyl acrylate and methacrylate, n-propyl acrylate, n-butyl acrylate and methacrylate, and iso-butyl acrylate and methacrylate, are preferred.

Suitable monomers (A) are, in particular, α,β-monoolefinic monocarboxylic acids and/or dicarboxylic acids of, preferably, 3 to 5 carbon atoms, e.g. acrylic acid, methacrylic acid, crotonic acid, itaconic acid, maleic acid and fumaric acid, and monoalkyl esters of dicarboxylic acids of the above type with alkanols of, preferably, 1 to 4 carbon atoms, such as monomethyl maleate, monoethyl itaconate, mono-n-butyl itaconate and monethyl fumarate. Examples of monoolefinic monomers (A) containing sulfonic acid groups are vinylsulfonic acid and its alkali metal salts, but especially its ammonium and sodium salt, β-acrylamido-methyl-propanesulfonic acid, β-methacrylamido-β-methyl-propanesulfonic acid, vinylbenzenesulfonic acid, vinylbenzylsulfonic acid and monomers which contain both carboxyl and sulfonic acid groups, e.g. monomers of the general formula (I)

-continued

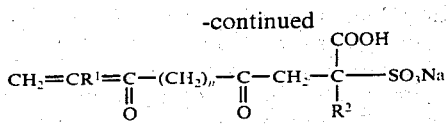

where $R^1$ is H and $-CH_3$, $R^2$ is H and $-CH_3$ and $n$ is from 1 to 4. Examples of suitable monomers (A) containing phosphate or phosphite groups are esters or amides of the general formula:

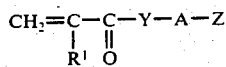  (II)

in which $R^1$ is H and $CH_3$, Y is $-O-$, $-NH-$ and $-NR-$, A is alkylene of 1 to 8 carbon atoms, preferably of 1 to 4 carbon atoms,

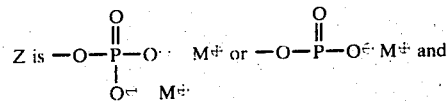

M is a cation, preferably $NH_4^+$, $Na^+$, $K^+$ or $H^+$.

Accordingly, the monoolefinic monomers (A) contain at least one functional group from amongst carboxyl, sulfonic acid, phosphate and/or phosphite, which may also be in the form of a salt, e.g. the sodium, potassium or ammonium salt.

Monoolefinic monomers (A) of particular interest are acrylic acid, methacrylic acid, itaconic acid, vinylsulfonic acid and their water-soluble salts, and β-acrylamido-β-methylpropanesulfonic acid and β-methacrylamido-β-methylpropanesulfonic acid. The amount of such monomers (A) is preferably from 1 to 10 percent by weight, based on total monomers.

Monomers (B) of which, preferably, from 6 to 15 percent by weight, based on total monomers, are copolymerized, are, e.g., N-vinylpyridone, N-vinylimidazole and vinybenzyl-(dialkyl)-amines, wherein alkyl is in most cases of 1 to 4 carbon atoms, and their substituted, protonized and quaternized derivatives. Examples of quaternizing agents which may be used are methyl chloride, benzyl chloride, dimethyl sulfate or chloroacetate acid.

Monomers (B) of very particular interest are acrylic and methacrylic acid derivatives of the general formula

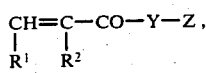  (III)

where
$R^1$ is H, $-COOH$, $-COO$ (where alkyl is preferably of 1 to 4 carbon atoms), $-CONH_2$ and $-CONR^4R^5$, but is preferably H,
$R^2$ is H and $-CH_3$, Y is $-O-$, $-NA-$ and $-NR^4-$,
A is

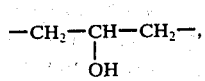

alkylene of 1 to 8 carbon atoms, $-CH_2-CH_2-SO_2-CH_2-CH_2-$, $-CH_2-CH_2-SO-CH_2-CH_2-$ and $-CH_2-CH_2-S-CH_2-CH_2-$, but preferably is alkylene of 1 to 4 carbon atoms, such as $-CH_2-$, $-CH_2-CH_2-$, $-CH_2-CH_2-CH_2-$, $-CH_2-CH_2-CH_2-CH_2-$ and

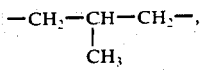

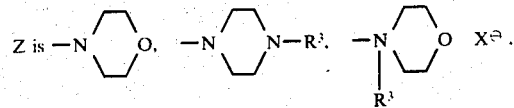

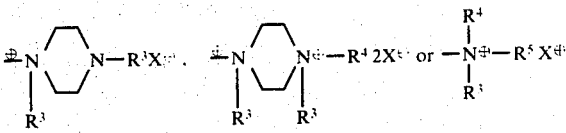

$R^3$ is H, alkyl, alkenyl, benzyl, hydroxyethyl, hydroxypropyl, acylaminoalkyl, alkoxyalkyl, polyoxyalkylene,

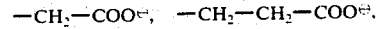

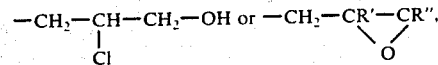

but preferably is H or alkyl of 1 to 4 carbon atoms,
$R^4$ and $R^5$ are H, alkyl, cycloalkyl or benzyl, but preferably H or alkyl of 1 to 4 carbon atoms and
X is an organic or inorganic acid radical, preferably chloride, sulfate, methylsulfate, ethylsulfate, phosphate, formate or acetate.

Monomers (E), of which the proportion is in most cases only up to 15 percent by weight, based on total monomers, are, e.g., acrylic and methacrylic acid esters of alkanols of more than 8 carbon atoms, such as n-dodecyl acrylate, acrylic and methacrylic acid esters containing halogen atoms and hydroxyl groups, such as 3-chloro-2-hydroxypropyl acrylate and methacrylate, monoesters of acrylic or methacrylic acid with α,ω-alkanediols, preferably of 2 to 8, and especially of 2 to 4, carbon atoms, such as glycol monoacrylate and monomethacrylate, 1,4-butanediol monoacrylate, 1,4-butanediol monomethacrylate and glycidyl acrylate, optionally substituted amides of α,β-olefinic monocarboxylic or dicarboxylic acids, preferably of 3 to 5 carbon atoms, such as acrylamide, methacrylamide, N-methylolmethacrylamide, N-methylmethacrylamide, N-n-butoxymethylacrylamide and maleic acid diamide, and also monomers with 2 polymerizable ethylenic double bonds, e.g. diallyl phthalate, glycol diacrylate and dimethacrylate, 1,4-butanediol diacrylate, vinyl acrylate and allyl acrylate as well as (in amounts mostly from 10 to 30 percent by weight), vinyl esters of saturated carboxylic acids, in particular vinyl acetate, vinyl propionate, vinyl-n-butyrate and/or vinyl laurate, i.e. vinyl esters of saturated aliphatic carboxylic acids of 2 to 12 carbon atoms, and also vinyl chloride, vinylidene chloride and vinylpyrrolidone.

The amount of monomers (C) and (D) should together preferably be at least 50, and in particular at least 70, percent by weight. In the new process of emulsion polymerization in an aqueous medium containing conventional polymerization initiators it is not necessary to have emulsifiers present, and, surprisingly, exceptionally shear-resistant emulsions are obtained even without additional use of emulsifiers. However, conventional cationic, anionic, amphoteric and non-ionic emulsifiers, preferably cationic emulsifiers, can be present, in the conventional amounts for this purpose, i.e. in most cases from 1 to 5 percent by weight, based on the amount of monomer. It is also possible to use mixtures of the above emulsifiers which form homogeneous solutions in water. Examples of non-ionic emulsifiers are, above all, adducts of from 7 to 50 moles of ethylene oxide with 1 mole of a long-chain alcohol, amine or alkylphenol. Examples of suitable anionic emulsifiers are the conventional alkyl sulfates, alkyl-sulfonates and alkyl phosphates, which may also be in the form of adducts with ethylene oxide. Suitable amphoteric emulsifiers are, in particular, fatty acid aminoalkyl-betaines. Examples of suitable cationic emulsifiers are salts of fatty amines, e.g. dimethyl-dodecyl-ammonium sulfate or quaternized fatty amines, e.g. dimethyl-benzyl-fatty alkyl-ammonium chloride or saccharinate. Further suitable emulsifiers are described, e.g., in Houben-Weyl, Methoden der Organischen Chemie, Volume XIV/1, Makromolekulare Stoffe, Georg Thieme Verlag, Stuttgart, 1961, pages 192 to 208.

The conventional initiators which form free radicals and which in general are water-soluble, may be used for the process. Examples of suitable initiators are persulfates, such as sodium persulfate, potassium persulfate and ammonium persulfate, hydrogen peroxide, perborates, such as sodium perborate and, advantageously, redox catalysts which contain, e.g., sodium bisulfite, ascorbic acid, Fe(II) salts, Cu(I) salts or Co(II) salts as the reducing component and, e.g., hydrogen peroxide, iorn-III salts, such as iron-III chloride, or alkali metal persulfates as the oxidizing component, but preferably hydrogen peroxide as the oxidizing component in combination with iron salts or copper salts. Further suitable polymerization catalysts are azo-bis-carboxylic acid derivatives, described, e.g., in U.S. Pat. No. 2,471,959.

The amount of such initiators which form free radicals in general lies within the conventional range, i.e. from 0.2 to 4, preferably from 0.5 to 2, percent by weight of the initiator or redox catalyst system, based on the amount of monomers. In the present process, the initiators are in general added in part to the aqueous medium during, or prior to, the copolymerization of the monomers (A) and (B), whilst the remainder is in general added before or during addition of the monomers (C), (D) and, where relevant (E). The emulsion polymerization is in general carried out at from 10° to 100° C, in particular from 60° to 95° C, in most cases at atmospheric pressure.

To obtain particularly shear-resistant copolymer emulsions it is necessary first to polymerize the monomers (A) and (B) at least partially, in most cases to the extent of at least 70% and in particular to the extent of at least 95%, during which stage small amounts of monomers (C), (D) and (E) may also be present. However, the amount of these latter monomers should initially in general not exceed 10 percent by weight, based on the sum of the amounts of monomers (A) and (B). If the stated polymerization sequence is not observed, copolymer emulsions of substantially poorer shear resistance are obtained; for example, this is the case if only the monomer (B) is prepolymerized and the monomer (A) is added together with the comonomers, or only the monomer (A) is prepolymerized and the monomer (B) is added with the other comonomers. The present process gives particularly shear-resistant copolymer emulsions, which are stable to electrolytes and also to acids and alkalis at pH from 2 to 12. In addition, the aqueous emulsions manufactured by the present process contain relatively little unconverted monomer even if the polymerization time is short. Their polymer content lies within the conventional range and is in most cases from 20 to 60, in particular from 25 to 40, percent by weight of copolymer, based on the total emulsion. The emulsions may be used for impregnating and coating textiles, leather and other sheet-like fibrous substrates, as binders for nonwovens, and particularly for coating and sizing paper; where appropriate, e.g. when coating paper, the conventional amounts of the conventional pigments may also be present.

In the Examples which follow, parts and percentages are by weight.

EXAMPLE 1

A mixture of 1,000 parts of water, 30 parts of acetic acid and 38 parts of acrylic acid is heated to 85° C under nitrogen and 56 parts of 2-N,N-diethylaminoethyl acrylate, 0.025 part of iron-III sulfate and 5 parts of 30% strength aqueous hydrogen peroxide solution are added. The polymerization commences immediately and after 20 minutes' polymerization the addition of a mixture of 180 parts of n-butyl acrylate and 135 parts of acrylonitrile, and the addition of 20 parts of 30% strength aqueous hydrogen peroxide solution, are started. The addition of the remaining monomers is complete after 2 hours. Polymerization is continued for a further 2 hours, and after cooling an exceptionally shear-resistant copolymer emulsion which may be used, e.g., for sizing paper, is obtained.

EXAMPLE 2

A mixture of 500 parts of water, 30 parts of acetic acid, 38 parts of $\beta$-acrylamido-$\beta$-methyl-propanesulfonic acid (AMPS) and 3 parts of dimethylbenzylammonium chloride is heated to 85° C under nitrogen. 56 parts of 2-N,N-diethylaminoethyl acrylate, 0.025 part of iron-II sulfate and 5 parts of 30% strength aqueous hydrogen peroxide solution are then added. The polymerization starts immediately. After 20 minutes' polymerization, the addition of a mixture of 500 parts of water, 180 parts of n-butyl acrylate, 135 parts of acrylonitrile and 3 parts of dimethyldodecylbenzylammonium chloride, and the addition of 20 parts of 30% strength aqueous hydrogen peroxide solution, are started. After 2 hours, the addition of monomer is complete and polymerization is continued for a further 2 hours. After cooling, an exceptionally shear-resistant emulsion which may be used for the surface sizing of paper is obtained.

COMPARATIVE EXPERIMENTS ACCOMPANYING EXAMPLE 2 a. The procedure of Example 2 is followed except that no AMPS is added. An unstable copolymer emulsion, which still contains a large amount of unconverted monomers and which separates into 2 phases after a few hours, is obtained.

b. The procedure of Example 2 is followed but all the monomers, without the polymerization initiator, are carefully stirred by means of a high speed stirrer, to form an emulsion. 30% of the emulsion are used as the initial charge and the polymerization initiator is then added. After the polymerization has started, the remainder of the emulsion is added in the course of from 2 to 4 hours. An unstable emulsion, which immediately separates into 2 phases, is obtained.

c. The procedure of Example 2 is followed, but the AMPS is not prepolymerized with the basic monomers and instead is added to the initial charge together with the monomers (C) and (D). In this case, again, an unstable emulsion is obtained, which immediately separates into 2 phases.

EXAMPLE 3

The general instructions of Example 2 are followed but in place of diethylaminoethyl acrylate and AMPS, 15 parts of 3-N,N-dimethylaminopropyl acrylamide and 5 parts of acrylic acid are used in the initial charge. Furthermore, 40 parts of n-butyl acrylate and 40 parts of acrylonitrile are added in place of the amounts of these monomers stated in Example 2. An exceptionally shear-resistant emulsion which may be used, e.g., for the coating of textiles, is obtained.

COMPARATIVE EXPERIMENTS ACCOMPANYING EXAMPLE 3 a. The procedure of Example 3 is followed, but without using acrylic acid. An exceptionally unstable emulsion is obtained, and the monomer conversion is low. The emulsion separates into 2 phases after one hour.

b. The procedure of Example 3 is followed, but all the monomers together are added, as an emulsion, to the initial charge, which contains the dimethyldodecylbenzylammonium chloride. In this case, again, an unstable emulsion is obtained, which immediately separates into 2 phases.

c. The procedure followed is as in Example 3 but the acrylic acid is not added to the initial charge and instead is introduced together with the butyl acrylate and acrylonitrile. An unstable emulsion, which immediately separates into 2 phases, is obtained.

EXAMPLE 4

The general instructions of Example 2 are followed but 7.5 parts of 2-N,N-diethylaminoethyl acrylate and, in place of AMPS, 3 parts of acrylic acid, are polymerized in the initial charge. Furthermore, only 59.5 parts of n-butyl acrylate and 40 parts of acrylonitrile are added. In this case, again, an exceptionally stable emulsion, which may be used for coating textiles, is obtained.

EXAMPLE 5

The general instructions of Example 2 are followed but 15 parts of 2-N,N-diethylaminoethyl acrylate and, in place of AMPS, 1.5 parts of acrylic acid, are polymerized in the initial charge. In place of the mixture of n-butyl acrylate and acrylonitrile, solely 83.5 parts of acrylonitrile are then added. An exceptionally stable emulsion is obtained.

EXAMPLE 6

The procedure of Example 2 is followed but 15 parts of diethylaminoethyl acrylate and, in place of AMPS, 1.5 parts of acrylic acid are used. Instead of the mixture of n-butyl acrylate and acrylonitrile, 83.5 parts of n-butyl acrylate are then run in. An exceptionally stable copolymer emulsion, which can be used as an adhesive raw material, is obtained.

EXAMPLE 7

The procedure of Example 2 is followed, but initially 15 parts of 2-N,N-diethylaminoethyl acrylate and, in place of AMPS, 1.5 parts of acrylic acid are used. Instead of the mixture of n-butyl acrylate and acrylonitrile, 30 parts of styrene and 53.5 parts of 2-ethylhexyl acrylate are then run in. In this case, again, a very stable emulsion, which can be used as an adhesive raw material, is obtained.

EXAMPLE 8

The procedure of Example 2 is followed but 10 parts of 2-N,N-dimethylaminoethyl methacrylate, quaternized with methyl chloride, and 4 parts of acrylic acid in place of AMPS, are used in the prepolymerization. 40 parts of n-butyl acrylate and 46 parts of acrylonitrile are then run in. A stable aqueous copolymer emulsion which can be used in paints is obtained.

COMPARATIVE EXPERIMENTS ACCOMPANYING EXAMPLE 8

If, for comparision purposes, all monomers together are added to the initial charge, an unstable emulsion is obtained. An unstable emulsion is also obtained if only acrylic acid, without the quaternized dimethylaminoethyl methacrylate, is prepolymerized in the initial charge.

EXAMPLE 9

The procedure of Example 1 is followed, but 12.5 parts of N-vinylimidazole, quaternized with dimethyl sulfate, and 4 parts of acrylic acid are prepolymerized in the initial charge. Thereafter, 43.5 parts of n-butyl acrylate and 40 parts of acrylonitrile are added. A very stable emulsion is obtained.

EXAMPLE 10

A mixture of 1,000 parts of water, 81 parts of N-vinylimidazole, 40 parts of acrylic acid, 120 parts of glacial acetic acid and 40 parts of Na lauryl-sulfate is heated to 85° C and 0.05 part of ammonium iron-II sulfate and 5 parts of 30% strength aqueous hydrogen peroxide solution are added. The polymerization starts immediately. After 30 minutes' polymerization, the addition of a mixture of 350 parts of n-butyl acrylate and 350 parts of acrylonitrile, and the addition of 20 parts of 30% strength aqueous hydrogen peroxide solution, are started. After 2 hours, the addition of monomer is complete, and polymerization is continued for a further hour. An emulsion which is exceptionally stable at pH from 2 to 12 is obtained.

We claim:
1. In a process for the manufacture of shear-resistant, aqueous copolymer emulsions by copolymerizing the monomers in an aqueous emulsion containing conventional polymerization initiators which form free radicals, the improvement which comprises initially copolymerizing in a reaction vessel (the amounts being based on total monomers)
   A. from 0.5 to 15 percent by weight of monoolefinic monomers containing a functional group selected from the groups consisting of the carboxyl group, the sulfonic acid group and the phosphate group, and
   B. from 5 to 30 percent by weight of monoolefinic monomers containing a functional group selected from the group consisting of a tertiary amino group, a quaternary amino group and a heterocyclic group containing nitrogen and thereafter, while continuing the copolymerization, adding to said vessel C. from 0 to 94.5 percent by weight of a monomer from the group consisting of styrene and acrylonitrile and D. from 0 to 94.5 percent by weight of acrylic or methacrylic acid esters of alkanols of 1 to 8 carbon atoms, as well as E. from 0 to 30 percent by weight of further olefinic monomers and thereafter completing the polymerization, the pH during the polymerization being less than 7 and the amount of monomers (C) and (D) together being at least 25 percent by weight.

2. In a process for the manufacture of shear-resistant aqueous copolymer emulsions by copolymerizing the monomers in an emulsion containing conventional polymerization initiators which form free radicals, the improvement which comprises initially copolymerizing in a reaction vessel (the amounts being based on total monomers)

A. from 0.5 to 15 percent by weight of monomers selected from the group consisting of acrylic acid, methacrylic acid, itaconic acid, vinylsulfonnic acid, β-acrylamido-β-methylpropanesulfonic acid and β-methacrylamido-β-methylpropanesulfonic acid B. from 5 to 30 percent by weight of monoolefinic monomers containing a functional group selected from the group consisting of a tertiary amino group, a quaternary amino group and a heterocyclic group containing nitrogen and thereafter, while continuing the copolymerization, adding to said vessel C. from 0 to 94.5 percent by weight of monomers from the group of styrene and acrylonitrile and D. from 0 to 94.5 percent by weight of acrylic or methacrylic acid esters of alkanols of 1 to 8 carbon atoms, as well as E. from 0 to 30 percent by weight of further olefinic monomers and thereafter completing the polymerization, the pH during the polymerization being less than 7 and the amount of monomers (C) and (D) together being at least 25 percent by weight.

3. In a process for the manufacture of shear-resistant aqueous copolymer emulsions by copolymerizing the monomers in an aqueous emulsion containing conventional polymerization initiators which form free radicals, the improvement which comprises initially copolymerizing in a reaction vessel (the amounts being based on total monomers)

A. from 0.5 to 15 percent by weight of monomers selected from the group consisting of acrylic acid, methacrylic acid, itaconic acid, vinylsulfonic acid, β-acrylamido-β-methylpropanesulfonic acid and β-methacrylamido-β-methylpropanesulfonic acid and B. from 5 to 30 percent by weight of monomers of the general formula

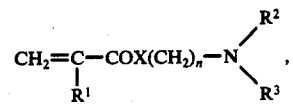

in which $R^1$ is a substituent selected from the group consisting of —H and —CH$_3$, $R^2$ and $R^3$ are each alkyl of 1 to 4 carbon atoms, X is selected from the group consisting of —O— and —N— and $n$ is a whole number from 2 to 4, and thereafter, while continuing the copolymerization, adding to said vessel C. from 0 to 94.5 percent by weight of monomers from the group of styrene and acrylonitrile and D. from 0 to 94.5 percent by weight of acrylic or methacrylic acid esters of alkanols of 1 to 8 carbon atoms, as well as E. from 0 to 30 percent by weight of further olefinic monomers and thereafter completing the polymerization, the pH during the polymerization being less than 7 and the amount of monomers (C) and (D) together being at least 25 percent by weight.

* * * * *

UNITED STATES PATENT AND TRADEMARK OFFICE
CERTIFICATE OF CORRECTION

PATENT NO. : 4,051,093
DATED : September 27, 1977
INVENTOR(S) : Wendel et al

It is certified that error appears in the above-identified patent and that said Letters Patent are hereby corrected as shown below:

Column 9, line 25, "vinylsulfonnic" should read --vinylsulfonic--
Column 10, line 27, "-N-" should read --$\overset{H}{N}$--.

Signed and Sealed this

Eleventh Day of April 1978

[SEAL]

Attest:

RUTH C. MASON
Attesting Officer

LUTRELLE F. PARKER
Acting Commissioner of Patents and Trademarks